United States Patent [19]
Berta

[11] Patent Number: 6,013,734
[45] Date of Patent: Jan. 11, 2000

[54] THERMOPLASTIC OLEFIN COMPOSITION CONTAINING AN ETHYLENE POLYMER FOR MAKING MOLDED PARTS HAVING A GOOD PAINT ADHESION/DURABILITY BALANCE

[75] Inventor: Dominic A. Berta, Newark, Del.

[73] Assignee: Montell North America Inc., Wilmington, Del.

[21] Appl. No.: 08/841,018

[22] Filed: Apr. 29, 1997

[51] Int. Cl.[7] .................................................. C08L 23/30
[52] U.S. Cl. ............................................ 525/221; 525/211
[58] Field of Search ................................... 525/221, 211, 525/232, 240

[56] References Cited

U.S. PATENT DOCUMENTS

| | | | |
|---|---|---|---|
| 4,990,568 | 2/1991 | Benefield et al. | 525/232 |
| 5,075,173 | 12/1991 | Benefield et al. | 438/424.8 |
| 5,212,246 | 5/1993 | Ogale | 525/240 |
| 5,302,454 | 4/1994 | Cecchin et al. | 428/402 |
| 5,763,534 | 6/1998 | Srinivasah | 525/240 |

*Primary Examiner*—Christopher Henderson

[57] ABSTRACT

A polymer composition for making molded parts including (1) a thermoplastic olefin, (2) a propylene polymer material, and (3) an oxidized polyethylene wax having an acid number of ≧15 mg KOH/g, a high molecular weight ethylene polymer, or mixtures thereof, wherein (2)+(3) equals at least 22.5 parts per hundred parts of the thermoplastic olefin, has a good paint adhesion/durability balance. Injection molded parts made from this composition have a unique morphology characterized by a continuous matrix phase and discrete particles of a dispersed phase having a specific aspect ratio near the surface of the part and a specific particle size in the core of the part.

8 Claims, 2 Drawing Sheets

THERMOPLASTIC OLEFIN COMPOSITION CONTAINING AN ETHYLENE POLYMER FOR MAKING MOLDED PARTS HAVING A GOOD PAINT ADHESION/DURABILITY BALANCE

FIELD OF THE INVENTION

This invention relates to thermoplastic olefin compositions.

BACKGROUND OF THE INVENTION

Thermoplastic olefins (TPOs) are uncrosslinked blends of olefin polymers, usually crystalline polyethylene or polypropylene, and olefin copolymer rubbers or elastomers, e.g., copolymers of olefins such as ethylene and propylene or butene. They can be made by physically blending in an internal mixer, or by polymerizing in a reactor. These materials have impact properties that allow them to be used in such applications as bumpers for automobiles and other automotive or industrial products. It is desirable under many circumstances to paint parts made from these TPOs. These materials are not paintable or coatable, because the paints or coatings consist of polar materials like urethanes, acrylics, epoxies, or melamines that have very poor adhesion to nonpolar materials like polyolefins. Various methods are used to enhance the paintability of the TPOs, e.g., flame treatment, surface oxidation, and plasma treatment, and in many cases an adhesion promoter is used as a tie layer between the TPO substrate and the paint coating. Such adhesion promoters usually contain chlorinated polyolefins and alkyd resins.

The rubber content and morphology of the thermoplastic olefin are important in obtaining good paint adhesion. In most cases the parts are injection molded and thus subjected to various shear forces that distort the elastomer particles. Two problems are encountered: (1) the paint adhesion is usually poor near high shear regions, e.g., near the gate area of the part, and (2) formulations that paint well have poor durability, i.e., the paint is removed due to scraping or shearing forces across the painted part during service, or by nicking due to stones or other debris. Hence there is a need for a thermoplastic olefin material that does not have these disadvantages.

SUMMARY OF THE INVENTION

The composition of this invention comprises:

(1) a thermoplastic olefin comprising, by weight,
 (a) about 20% to about 70% of a crystalline propylene homopolymer having an isotactic index greater than 90, or a crystalline propylene copolymer with ethylene and/or a $C_{4-8}$ α-olefin having a propylene content greater than 85% and an isotactic index of greater than 85;
 (b) about 20% to about 75% of an amorphous copolymer of ethylene selected from the group consisting of (i) ethylene/propylene, (ii) ethylene/butene-1, (iii) ethylene/octene-1, and (iv) mixtures thereof, optionally containing about 1% to about 10% of a diene, which is xylene soluble at room temperature and contains about 30% to about 70% ethylene; and
 (c) about 2% to about 30% of a semi-crystalline copolymer of ethylene selected from the group consisting of (i) ethylenelpropylene, (ii) ethylene/butene-1, (iii) ethylene/octene-1, and (iv) mixtures thereof, that is xylene insoluble at room temperature and contains greater than 90% ethylene, (2) at least 15 to about 50 parts per hundred parts of the thermoplastic olefin (1) of a propylene polymer material comprising:
 (a) about 10% to about 50% of a crystalline propylene homopolymer having an isotactic index of about 80 to about 99, or a crystalline copolymer having an isotactic index greater than 85 selected from the group consisting of (i) propylene and ethylene, (ii) propylene, ethylene and a $CH_2{=}CHR$ α-olefin, where R is a $C_{2-8}$ straight or branched alkyl group, and (iii) propylene and an α-olefin as defined above in (a)(ii), the copolymer containing about 85% to about 99% propylene and having an isotactic index of greater than 80 to about 98;
 (b) about 3% to about 20% of a semi-crystalline, essentially linear copolymer having a crystallinity of about 20% to about 60% by differential scanning calorimetry (DSC), wherein the copolymer is selected from the group consisting of (i) ethylene and propylene containing over 50% ethylene; (ii) ethylene, propylene, and an α-olefin as defined above in (a)(ii), containing about 1% to about 10% of the α-olefin and over 50% up to 98% of both ethylene and the α-olefin; and (iii) ethylene and an α-olefin as defined in (a)(ii) containing over 50% up to 98% of the α-olefin, which copolymer is insoluble in xylene at ambient temperature; and
 (c) about 40% to about 80% of a copolymer selected from the group consisting of a copolymer of (i) ethylene and propylene, wherein the copolymer contains from 20% to less than 40% ethylene, (ii) ethylene, propylene, and an α-olefin as defined in (a)(ii), wherein the α-olefin is present in an amount of about 1% to about 10%, and the amount of ethylene and α-olefin present is from 20% to less than 45%; and (iii) ethylene and an α-olefin as defined in (a)(ii), containing from 20% to less than 45% of the α-olefin, and optionally containing about 0.5% to about 10% of a diene, the copolymer (c) being soluble in xylene at ambient temperature, and having an intrinsic viscosity of about 1.7 to about 3.9 dl/g, wherein the total amount of (2)(b) and (2)(c), based on the total propylene polymer material, is about 65% to about 80%, the weight ratio of (2)(b)/(2)(c) is less than 0.4, and the total content of ethylene or $C_{4-8}$ α-olefin or combination thereof in (2)(b)+(2)(c) is less than 50%, and (3) an ethylene polymer material selected from the group consisting of:
 (a) about 2.5 parts to about 20 parts per hundred parts of the thermoplastic olefin of an oxidized polyethylene wax having an acid number equal to or greater than 15 mg KOH/g, a molecular weight $M_n$ of about 1000 to about 100,000, and a melting point of about 92° C. to about 140° C.,
 (b) about 8 parts to about 18 parts per hundred parts of the thermoplastic olefin of a homopolymer of ethylene or a copolymer or terpolymer of ethylene and at least one α-olefin, having a molecular weight $M_n$ greater than 125,000 and a melt index (ASTM D-1238, 2.16 kg at 190° C.) of 0.5 to about 125 g/10 min, and
 (c) a mixture of (a)+(b), wherein the ratio of (a) to (b) is 0.1 to 0.9, wherein (2)+(3) is at least 22.5 parts per hundred parts of the thermoplastic olefin.

In another embodiment, component (1) comprises a thermoplastic olefin comprising, by weight, (a) about 60% to about 90% of a crystalline propylene homopolymer having an isotactic index greater than 90, or a crystalline propylene copolymer with ethylene and/or a $C_{4-8}$ α-olefin having a propylene content greater than 85% and an isotactic index of greater than 85; and (b) about 10% to about 40% of an amorphous copolymer of ethylene selected from the group consisting of (i) ethylene/propylene, (ii) ethylene/butene-1, (ii) ethylene/octene-1, and (iv) mixtures thereof, optionally containing about 1% to about 10% of a diene, which is xylene soluble at room temperature and contains about 30% to about 70% ethylene.

Injection molded articles made from these compositions are typically characterized by a continuous thermoplastic matrix phase and discrete particles of an elastomeric dispersed phase containing the ethylene polymer material of component (3) having an aspect ratio of about 2 to about 4 at a distance of $10\mu$ or less from the surface of the article and a particle size diameter of about 0.2 to about $0.5\mu$ at a distance of greater than $10\mu$ from the surface of the article after being subjected to a shear rate greater than 100 $\text{sec}^{-1}$.

The addition of the propylene polymer material and the ethylene polymer material to the thermoplastic olefin produces outstanding paint adhesion and outstanding durability in painted parts molded from the composition.

BRIEF DESCRIPTION OF THE DRAWINGS

The unique morphology of the compositions of this invention is illustrated by reference to the accompanying drawings. The samples were cryo-microtomed parallel to the flow direction through the thickness of an injection molded part.

DETAILED DESCRIPTION OF THE INVENTION

In one embodiment, component (1) of the composition of this invention is a thermoplastic olefin comprising, by weight, (a) about 20% to about 70%, preferably about 50% to about 70%, of a crystalline propylene homopolymer having an isotactic index greater than 90, preferably between 95 and 98, or a crystalline propylene copolymer with ethylene and/or a $C_{4-8}$ α-olefin having a propylene content greater than 85% and an isotactic index of greater than 85;

(b) about 20% to about 75%, preferably about 30 to about 50%, most preferably about 30% to about 35%, of an amorphous copolymer of ethylene selected from the group consisting of (i) ethylenelpropylene, (ii) ethylene/butene-1, (iii) ethylene/octene-1, and (iv) mixtures thereof, optionally containing about 1% to about 10%, preferably about 1% to about 4%, of a diene, which is xylene soluble at room temperature and contains about 30% to about 70% ethylene, preferably about 40% to about 60%, and (c) about 2% to about 30%, preferably about 2% to about 10%, most preferably about 2% to about 5%, of a semi-crystalline ethylene copolymer selected from the group consisting of (i) ethylene/propylene, (ii) ethylene/butene-1, (iii) ethylene/octene-1, and (iv) mixtures thereof, that is xylene insoluble at room temperature and contains greater than 90% ethylene.

A random propylene/ethylene copolymer having an ethylene content of about 1% to about 5%, preferably about 2% to about 3%, is preferred for component (1)(a).

The $C_{4-8}$ α-olefins useful in the preparation of the thermoplastic olefin include, for example, butene-1; pentene-1; hexene-1; 4-methylpentene-1, and octene-1.

The diene, when present, is typically a butadiene; 1,4-hexadiene; 1,5-hexadiene, or ethylidenenorbornene.

Preferably (1) (a), (b), and (c) are formed in a reactor or series of reactors in at least two stages by first polymerizing propylene to form (a) and then polymerizing ethylene and propylene, butene-1, or octene-1, or mixtures thereof, in the presence of (a) and the catalyst used in the first stage to form (b) and (c). The polymerization can be conducted in the liquid or gas phase or in liquid-gas phase. In the alternative, (a), (b), and (c) can each be prepared separately and then mixed by melt-kneading or melt blending.

Component (1)(a) can be prepared using a Ziegler-Natta catalyst or a mixture of Ziegler-Natta and metallocene catalysts. Components (1)(b) and (1)(c) can be prepared using Ziegler-Natta or metallocene catalysts or a combination of the two, with one type of catalyst being used for one stage and the other type of catalyst being used for the next stage when the TPO is made by sequential polymerization.

The preparation of the thermoplastic olefin is described in more detail in U.S. Pat. No. 5,302,454, which preparation is incorporated herein by reference.

In another embodiment, component (1) comprises a thermoplastic olefin comprising, by weight, (a) about 60% to about 90%, preferably about 65% to about 80%, of a crystalline propylene homopolymer having an isotactic index greater than 90, or a crystalline propylene copolymer with ethylene and/or a $C_{4-8}$ α-olefin having a propylene content greater than 85% and an isotactic index of greater than 85, and (b) about 10% to about 40%, preferably about 15% to about 30%, of an amorphous copolymer of ethylene selected from the group consisting of (i) ethylene/propylene, (ii) ethylene/butene-1, (iii) ethylene/octene-1, and (iv) mixtures thereof, optionally containing about 1% to about 10% of a diene, which is xylene soluble at room temperature and contains about 30% to about 70% ethylene.

In this embodiment, component (1) is preferably prepared by making each component separately and then mixing by melt-kneading or melt blending. Alternatively, component (1) can also be prepared by the sequential polymerization process described above.

Component (2) of the composition of this invention is a propylene polymer material comprising:

(a) about 10% to about 50% of a crystalline propylene homopolymer having an isotactic index of about 80 to about 99, or a crystalline copolymer having an isotactic index greater than 85 selected from the group consisting of (i) propylene and ethylene, (ii) propylene, ethylene and a $CH_2=CHR$ α-olefin, where R is a $C_{2-8}$ straight or branched alkyl group, and (iii) propylene and an α-olefin as defined above in (a)(ii), the copolymer containing about 85% to about 99% propylene and having an isotactic index of greater than 80 to about 98;

(b) about 3% to about 20% of a semi-crystalline, essentially linear copolymer having a crystallinity of about 20% to about 60% by differential scanning calorimetry (DSC), wherein the copolymer is selected from the group consisting of (i) ethylene and propylene containing over 50% ethylene; (ii) ethylene, propylene, and an α-olefin as defined above in (a)(ii), containing about 1% to about 10% of the α-olefin and over 50% up to 98% of both ethylene and the α-olefin, and (iii) ethylene and an α-olefin as defined in (a)(ii) containing over 50% up to 98% of the α-olefin, which copolymer is insoluble in xylene at ambient temperature; and (c) about 40% to about 80% of a copolymer selected from the group consisting of a copolymer of (i) ethylene and propylene, wherein the copolymer contains from 20% to less than 40% ethylene, (ii) ethylene, propylene, and an α-olefin as defined in (a)(ii), wherein the α-olefin is present in an amount of about 1% to about 10%, and the amount of ethylene and α-olefin present is from 20% to less than 45%; and (iii) ethylene and an α-olefin as defined in (a)(ii), containing from 20% to less than 45% of the α-olefin, and optionally containing about 0.5% to about 10% of a diene, the copolymer (c) being soluble in xylene at ambient temperature, and having an intrinsic viscosity of about 1.7 to about 3.9 dl/g, wherein the total amount of (2)(b) and (2)(c), based on the total propylene polymer material, is about 50% to about 80%, the weight ratio of (b)/(c) is less than 0.4, and the total content of ethylene or $C_{4-8}$ α-olefin or combination thereof in (b)+(c) is less than 50%.

Polymer (2)(a) is preferably present in an amount of about 10% to about 40%, most preferably about 20% to about 35%. When (a) is a propylene homopolymer, the isotactic index is preferably about 85 to about 98. When (a) is a copolymer, the amount of propylene in the copolymer is preferably about 90% to about 99%.

Polymer (2)(b) is preferably present in an amount of about 7% to about 15%. Typically the crystallinity is about 20% to about 60% by DSC. Generally, the ethylene or α-olefin content or the combination of ethylene and the α-olefin when both are used is over 50% up to 98%, preferably about 80% to about 95%.

Polymer (2)(c) is preferably present in an amount of about 50% to about 70%. The ethylene or the α-olefin content or ethylene and the α-olefin content of (c) is preferably about 20% to about 38%, most preferably about 25% to about 38%.

The propylene polymer material has at least one melt peak, determined by DSC, present at temperatures higher than 120° C., and at least one peak, relative to the vitreous transition, present at temperatures from −10° C. and −35° C. In addition, these materials have a flexural modulus of less than 150 MPa, generally 20 to 100 MPa; a tensile strength at yield of 10 to 20 MPa; elongation at break over 400%; a tension set, at 75% strain, of 20% to 50%; a Shore D hardness of 20 to 35; a haze value of less than 40%, preferably less than 35%, and do not break (no brittle impact failure) when an Izod impact test is conducted at −50° C.

Polymer (2)(a) is preferably a random propylene/ethylene copolymer.

Suitable α-olefins of the formula $CH_2=CHR$ include, for example, butene-1; pentene-1; 4-methylpentene-1; hexene-1, and octene-1.

When a diene is present, it is typically a butadiene; 1,4-hexadiene; 1,5-hexadiene, or ethylidenenorbornene.

The propylene polymer material is preferably prepared by a polymerization process comprising at least two stages, where in the first stage the propylene, or propylene and ethylene or the α-olefin, or propylene, ethylene and the α-olefin are polymerized to form (a), and in the following stages the mixtures of ethylene and propylene or the α-olefin, or propylene, ethylene and the α-olefin, and optionally a diene, are polymerized to form (b) and (c).

The polymerization can be conducted in the liquid phase, gas phase, or liquid-gas phase using separate reactors, all of which can be done either by batch or continuously. For example, it is possible to carry out the polymerization of (a) using liquid propylene as a diluent, and the polymerization of (b) and (c) in the gas phase, without intermediate stages except for the partial degassing of the propylene. The preparation of the propylene polymer material is described in more detail in U.S. Pat. No. 5,212,246, which preparation is incorporated herein by reference.

In the alternative, (2)(a), (b), and (c) can each be prepared separately and then mixed by melt-kneading or melt blending.

Component (2) is present in an amount of at least 15 parts to about 50 parts, preferably about 20 parts to about 30 parts, and most preferably about 20 parts to about 25 parts, per hundred parts of the thermoplastic olefin.

Component (3) is an ethylene polymer material selected from the group consisting of (a) an oxidized polyethylene wax, (b) a high molecular weight ethylene polymer, and (c) a mixture of (a)+(b).

Component (3)(a) is an oxidized polyethylene wax having an acid number equal to or greater than 15 mg KOH/g and a molecular weight $M_n$ of about 1000 to about 100,000, preferably about 1000 to about 50,000, and a melting point of 92° to 140° C., preferably 94° to 136° C. The oxidized polyethylene wax is present in an amount of about 2.5 parts to about 20 parts, preferably about 5 parts to about 15 parts, and most preferably about 8 parts to about 12 parts, per hundred parts of the thermoplastic olefin.

Component (3)(b) is a homopolymer of ethylene or a copolymer or terpolymer of ethylene and at least one α-olefin, having a molecular weight $M_n$ greater than 125,000 and a melt index (ASTM D-1238, 2.16 kg at 190° C.) of 0.5 to about 125 g/10 min, preferably about 1 to about 10 g/10 min. When the polymer is made with a Ziegler-Natta catalyst, the comonomer content is 11% or less, and the density is 0.915–0.965 g/cm$^3$, preferably 0.92–0.96 g/cm$^3$. When the polymer is made with a metallocene catalyst, the comonomer content is about 12% to about 28%, and the density is 0.86–0.91 g/cm$^3$, preferably 0.87–0.90 g/cm$^3$.

The ethylene polymer is present in an amount of about 8 parts to about 18 parts, preferably about 10 parts to about 15 parts, per hundred parts of the thermoplastic olefin.

Component (1) and component (3)(b) can be produced together in a reactor, or component (3)(b) can be added as a separate component.

When both (3)(a) and (3)(b) are present, the ratio of (a) to (b) is 0.1 to 0.9.

In the composition of this invention, the amount of components (2)+(3) is at least 22.5 parts per hundred parts of the thermoplastic olefin.

The compounding or melt blending of the components of the composition can be carried out on an open roll, in an internal mixer (Banbury or Haake mixers), or in a single-screw or twin-screw extruder.

The composition of the present invention can also contain other conventional additives, for example, antioxidants; stabilizers; extender oils such as paraffinic and naphthenic oils; fillers such as $CaCO_3$, talc, and zinc oxide, and flame retardants.

In order to exhibit a good balance between paint adhesion and durability of the paint coating, the material from which a part is made should optimally have a high surface area for good paint adhesion and high strength in all directions for durability. These properties are especially important when the part is made by injection molding, where the material is subjected to high shear stress, i.e., a shear rate greater than 100 sec$^{-1}$.

Figure 1:
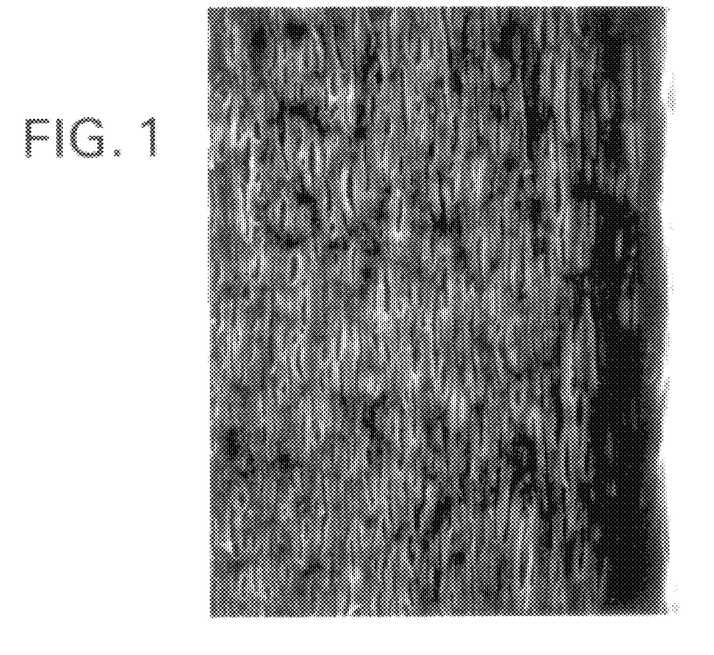
FIG. 1 is a 2000× photomicrograph of the surface of a part injection molded from the composition of this invention.
Figure 2:
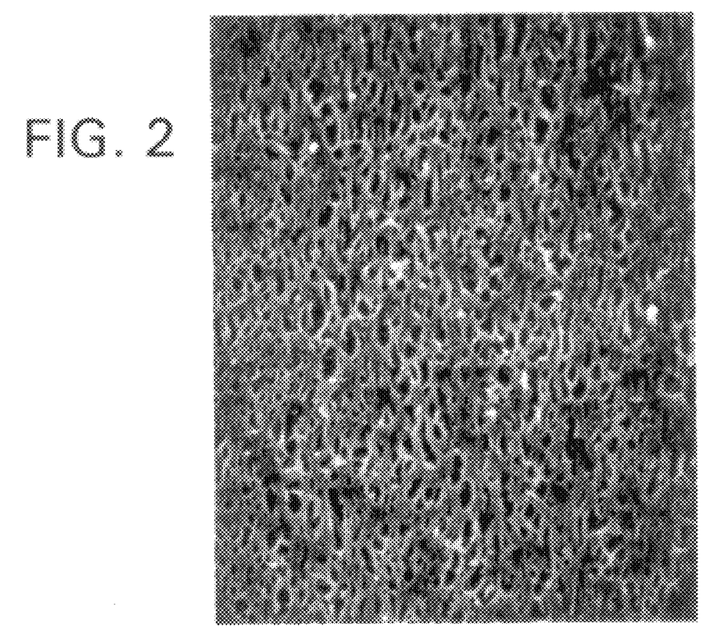
FIG. 2 is a 2000× photomicrograph of the core of a part injection molded from the composition of this invention.
Figure 3:
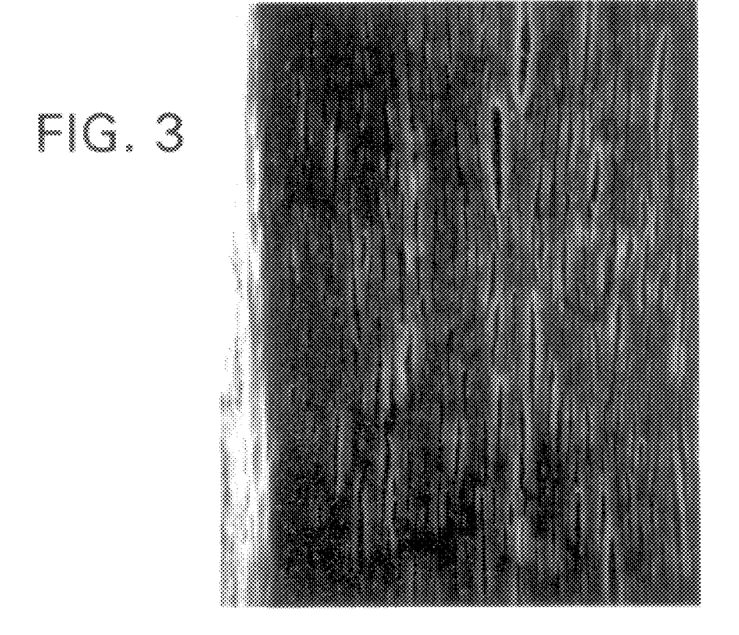
FIG. 3 is a 2000× photomicrograph of the surface of a part injection molded from a conventional TPO.
Figure 4:
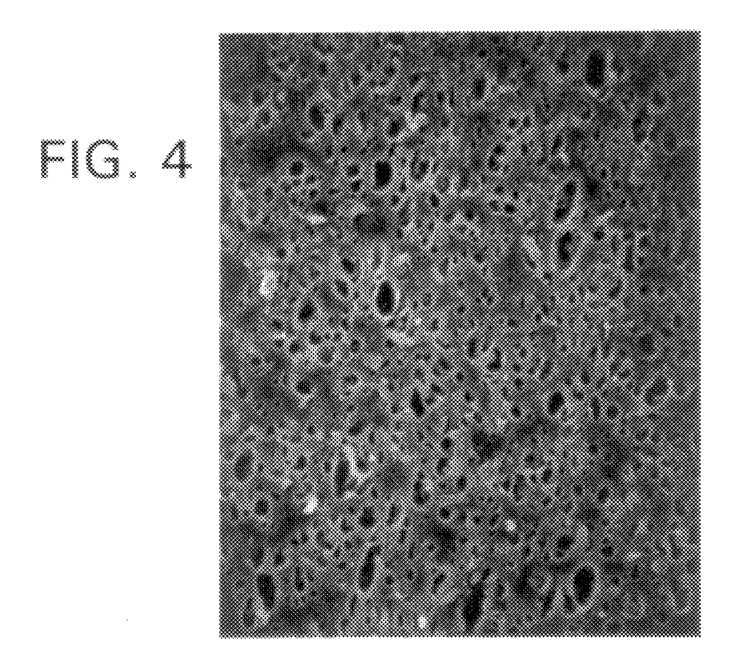
FIG. 4 is a 2000× photomicrograph of the core of a part injection molded from a conventional TPO.

Conventional TPOs exhibit a highly striated morphology near the surface (FIG. 3), with alternating matrix phase and dispersed elastomeric phase. The particles of dispersed elastomeric material (the dark vertical lines) are highly elongated, giving a large surface area to which the paint can attach. However, when stress is applied, as in a durability test, the layers can peel apart. This type of behavior is known as "anisotropic behavior", meaning that the physical properties are different in different directions. The elastomeric particles in the core (FIG. 4) are the large dark particles. In contrast, the compositions of this invention exhibit a unique morphology (FIG. 1 and FIG. 2) in which the particles of the dispersed phase near the surface and in the core are much smaller than in conventional TPOs (FIG. 3 and FIG. 4). The particles of the dispersed phase also have a large surface area for good paint adhesion, but in contrast to conventional TPOs, the material exhibits isotropic behavior, i.e., the physical properties are the same in all directions. The paint coating is therefore more durable under stress.

In one embodiment of the composition of this invention, the continuous matrix phase comprises the crystalline propylene homopolymers or copolymers of components (1)(a) and (2)(a) and the dispersed phase comprises the semi-crystalline or amorphous copolymers of components (1)(b), (1)(c), (2)(b), and (2)(c) plus component (3). In a second embodiment, the continuous matrix phase comprises (1)(a) and (2)(a) and the dispersed phase comprises (1)(b), (2)(b), and (2)(c) plus component (3).

While not wishing to be bound by theory, it is believed that the oxidized polyethylene wax and/or the high molecular weight polyethylene of component (3) migrate preferentially into the dispersed phase, causing the strands of elastomeric material to break apart into small particles when the material is subjected to high shear, as in injection molding. This type of stress is not present when a part is molded by a compression molding process, where the material to be molded is simply compressed and not subjected to shear.

The photomicrographs were taken at 2000× magnification with a Hitachi S-800 scanning electron microscope. The samples were cryo-microtomed parallel to the flow direction through the thickness of an injection molded part.

The aspect ratio, i.e., the ratio of the particle length to the particle diameter, of the dispersed phase within the top 10$\mu$ of an injection molded part made from the composition of this invention is typically about 2 to about 4, and the typical diameter of particles of the dispersed phase in the core of the part is about 0.2 to about 0.5$\mu$ at a shear rate of greater than 100 sec$^{-1}$. In a typical TPO, such as, for example, CA053 or CA186, both commercially available from Montell USA Inc., the aspect ratio within the top 10$\mu$ of an injected molded part molded under the same conditions is typically 10 to 50 and the diameter of the particles of the dispersed phase in the core of the particle is typically 1.0 to 2.0$\mu$.

In the following examples and comparative examples, all of the samples for testing were prepared by preblending the polymer powders or pellets by tumble blending by hand in a plastic bag or with a 3 lb Henschel mill, mixing in a twin screw extruder at a barrel temperature of 450° F., and then pelletizing. The pellets were injection molded into disks 4 inches in diameter and 125 mils thick that were painted with an adhesion promoter coating about 0.3 mils thick and a top coating about 1.5 mils thick. The adhesion promoter was Morton HP21054-4B1 coating material, commercially available from Morton Automotive Coatings, and contained a chlorinated polyolefin and an alkyd resin. The top coat was PPG HAP-9440 coating material, commercially available from PPG Industries, Inc., and contained a polyester-acrylic-melamine resin, 60% solids by weight. The coatings were cured at 250° F. for 30 minutes.

A lattice pattern of squares with each square about ¼ inch in size was scribed on the painted disk both near the gate area and at the end opposite the gate area of the disk. Adhesive tape (3M 898) was pressed onto the paint and pulled off to test the amount of paint removed or the paint adhesion. The % failure was recorded as the % of the squares removed by the tape after one pull. The durability was determined by using a Taber abrader with a type C scuffing head assembly and a one pound load. The painted disk was placed in an oven at 80° C. for one hour, removed and placed on the platform of the abrader. The scuffing head was placed in contact with the painted surface and the disk was rotated for a specified number of cycles. The amount of paint removed from the complete circumference subtended by the scuffing head was recorded as the % failure.

The criteria set for acceptable paint adhesion was less than 10% failure in the gate area (paint removed by the adhesive tape) and less than 2% in the area opposite the gate after the first pull, and less than 20% in the gate area and less than 8% in the area opposite the gate after the fifth pull. The criteria for durability was 30% or less of the paint removed by the Taber abrader after 100 cycles at 80° C.

In this specification all parts and percentages are by weight unless otherwise noted.

EXAMPLE 1 AND COMPARATIVE EXAMPLES 1–3

This example compares the paint adhesion and durability of a composition of this invention and compositions containing neither the propylene polymer material (PPM) nor the oxidized polyethylene wax, or only one of them.

In Table 1, the thermoplastic olefin (TPO) contained 68% of a random ethylene/propylene copolymer having an ethylene content of 2.6%, 2% of a semi-crystalline ethylene/propylene copolymer that was insoluble in xylene at room temperature, and 30% of an amorphous ethylene/propylene copolymer that was soluble in xylene at room temperature.

The PPM contained (a) 30% of a propylene/ethylene random copolymer having an ethylene content of 3.3%, (b) 6.8% of a semi-crystalline ethylene/propylene copolymer that was insoluble in xylene at room temperature, and (c) 63.2% of an amorphous ethylene/propylene copolymer that was soluble in xylene at room temperature.

B-225 was Irganox B-225 stabilizer, a blend of 1 part Irganox 1010 tetrakis[methylene(3,5-di-tert-butyl-4-hydroxyhydrocinnamate)]methane stabilizer and 1 part Irgafos 168 tris(2,4-di-t-butylphenyl) phosphite, commercially available from Ciba-Geigy Corporation.

The AC 316 oxidized polyethylene wax is commercially available from Allied Signal. The properties of the wax are given in Table 5. The numbers in parentheses are estimated values.

The symbols "g" and "op" stand for paint failure in the gate area of the disk (high shear) and paint failure in the area opposite the gate (moderate shear), respectively.

TABLE 1

|  | Ex. 1 | Comp. Ex. 1 | Comp. Ex. 2 | Comp. Ex. 3 |
|---|---|---|---|---|
| TPO | 100 | 100 | 100 | 100 |
| PPM | 20 | — | 20 | — |
| AC 316 | 10 | — | — | 10 |
| B 225 | 0.2 | 0.2 | 0.2 | 0.2 |
| Paint Adhesion (% Failure, g/op) | | | | |
| 1st Pull | 0/0 | 0/0 | 0/0 | 0/0 |
| 3rd Pull | 0/0 | 20/0 | 2/0 | 0/0 |
| 5th Pull | 2/0 | 42/0 | 12/0 | 0/0 |
| Durability (% Failure) | | | | |
| 25 Cycles | 2 | 28 | 30 | 20 |
| 100 Cycles | 3 | 55 | 56 | 39 |

The data given in Table 1 for Example 1 and the comparative examples show the dramatic improvement in both paint adhesion and durability when a composition of this invention comprising a TPO and both a PPM and an oxidized polyethylene wax, is compared with compositions containing neither the PPM nor the wax, or only one of them.

EXAMPLES 2–6 AND COMPARATIVE EXAMPLES 4–6

These examples and comparative examples show that although paint adhesion was good, durability was not acceptable when the acid number of the wax or the amount of PPM was too low. The results are shown in Table 2.

In Table 2, the thermoplastic elastomer and propylene polymer material are the same as in Example 1. The properties of the oxidized polyethylene waxes are given in Table 5. All of these waxes are commercially available from Allied Signal.

TABLE 2

|  | Ex.2 | Ex.3 | Ex.4 | Ex.5 | Ex.6 | Comp. Ex.4 | Comp. Ex.5 | Comp. Ex.6 |
|---|---|---|---|---|---|---|---|---|
| TPO | 100 | 100 | 100 | 100 | 100 | 100 | 100 | 100 |
| PPM | 15 | 20 | 20 | 30 | 20 | 10 | 15 | 20 |
| AC 316 | 10 | 2.5 | 5 | 5 | — | 10 | 5 | — |
| AC 325 | — | — | — | — | 10 | — | — | — |
| AC 307 | — | — | — | — | — | — | — | 10 |
| B 225 | 0.2 | 0.2 | 0.2 | 0.2 | 0.2 | 0.2 | 0.2 | 0.2 |
| Acid No. of Wax | 16 | 16 | 16 | 16 | 25 | 16 | 16 | 5–9 |
| Paint Adhesion (% Failure, g/op) | | | | | | | | |
| 1st Pull | 0/0 | 0/0 | 0/0 | 0/0 | 0/0 | 0/0 | 0/0 | 0/0 |
| 3rd Pull | 0/0.5 | 0/0 | 0/0 | 0/0 | 0/0 | 0/0 | 0/0 | 0/2 |
| 5th Pull | 0/1 | 0/0.5 | 0/0 | 1/0 | 0/0 | 0/0 | 0/0 | 0.8 |
| Durability (% Failure) | | | | | | | | |
| 25 Cycles | 25 | 30 | 1 | 8 | 25 | 35 | 40 | 45 |
| 100 Cycles | 30 | 30 | 3 | 10 | 25 | 35 | 40 | 45 |

EXAMPLES 7–11 AND COMPARATIVE EXAMPLE 7

These examples and Control Example 7 show that although adhesion was excellent, durability was not acceptable when the acid number of the wax was too low. The results are given in Table 3.

In Table 3, the TPO and PPM are the same as in Example 1. The properties of the Petrolite oxidized polyethylene waxes are given in Table 5. All of the waxes are commercially available from Petrolite Corporation.

TABLE 3

|  | Comp. Ex. 7 | Ex. 7 | Ex. 8 | Ex. 9 | Ex. 10 | Ex. 11 |
|---|---|---|---|---|---|---|
| TPO | 100 | 100 | 100 | 100 | 100 | 100 |
| PPM | 20 | 20 | 20 | 20 | 20 | 20 |
| Petr. C-8500 | 10 | — | — | — | — | — |
| Petr. C-7500 | — | 10 | — | — | — | — |
| Petr. C-3500 | — | — | 10 | — | — | — |
| Petr. C-9500 | — | — | — | 10 | — | — |
| Petr. E-2020 | — | — | — | — | 10 | — |
| Petr. E-1040 | — | — | — | — | — | 10 |
| B 225 | 0.2 | 0.2 | 0.2 | 0.2 | 0.2 | 0.2 |
| Acid No. of Wax | 9 | 15 | 24 | 31 | 22 | 40 |
| Paint Adhesion (% Failure, g/op) | | | | | | |
| 1st Pull | 0/0 | 0/0 | 0/0 | 0/0 | 0/0 | 0/0 |
| 3rd Pull | 0/0 | 0/0 | 0/0 | 0/0 | 0/0 | 0/0 |
| 5th Pull | 0/0 | 0/0 | 0/0 | 0/0 | 0/0 | 0/0 |
| Durability (% Failure) | | | | | | |
| 25 Cycles | 38 | 3 | 0 | 7 | 0 | 0 |
| 100 Cycles | 66 | 30 | 0 | 12 | 5 | 0.5 |

COMPARATIVE EXAMPLES 8–13

These comparative examples show that adding oxidized polyethylene waxes of various kinds to the thermoplastic elastomer without using the PPM will not give acceptable durability, although paint adhesion was excellent. The results are given in Table 4.

In Table 4, the TPO and PPM are the same as those used in Example 1. The properties of the Petrolite oxidized polyethylene waxes are given in Table 5. All of the waxes are commercially available from Petrolite Corporation.

TABLE 4

|  | Comp. Ex. 8 | Comp. Ex. 9 | Comp. Ex. 10 | Comp. Ex. 11 | Comp. Ex. 12 | Comp. Ex. 13 |
|---|---|---|---|---|---|---|
| TPO | 100 | 100 | 100 | 100 | 100 | 100 |
| PPM | — | — | — | — | — | — |
| Petr. C-8500 | 10 | — | — | — | — | — |
| Petr. C-7500 | — | 10 | — | — | — | — |
| Petr. C-3500 | — | — | 10 | — | — | — |
| Petr. C-9500 | — | — | — | 10 | — | — |
| Petr. E-2030 | — | — | — | — | 10 | — |
| Petr. E-1040 | — | — | — | — | — | 10 |
| B 225 | 0.2 | 0.2 | 0.2 | 0.2 | 0.2 | 0.2 |
| Paint Adhesion (% Failure, g/op) | | | | | | |
| 1st Pull | 0/0 | 0/0 | 0/0 | 0/0 | 0/0 | 0/0 |
| 3rd Pull | 0/0 | 0/0 | 0/0 | 0/0 | 0/0 | 0/0 |
| 5th Pull | 0/0 | 0/0 | 0/0 | 0/0 | 0/0 | 0/0 |
| Durability (% Failure) | | | | | | |
| 25 Cycles | 66 | 50 | 48 | 25 | 66 | 64 |
| 100 Cycles | 75 | 70 | 54 | 52 | 78 | 84 |

TABLE 5

|  | Acid No. | Mn | Viscosity cP@149° C. | Density g/cc | Melt Index g/10 min | Melt Pt. ° C. |
|---|---|---|---|---|---|---|
| AC 307 | 5–9 | 50,000 | 85,000 | 0.98 | >1,000 | 140 |
| AC 316 | 16 | 10,000 | 8,500 | 0.98 | >3,000 | 140 |
| AC 325 | 25 | 6,000 | 4,400 | 0.99 | >2,000 | 136 |
| Petr. C 8500 | 9 | (8,000) | (6,000) | — | >2,000 | 95 |
| Petr. C 7500 | 15 | (6,000) | (4,000) | — | >3,000 | 97 |
| Petr. C 3500 | 24 | 1,500 | 30 | — | >5,000 | 96 |
| Petr. C 9500 | 31 | (1,000) | (20) | — | >5,000 | 94 |
| Petr. E 2020 | 22 | 2,500 | 75 | — | >5,000 | 116 |
| Petr. E 1040 | 40 | (1,500) | 25 | — | >5,000 | 106 |

EXAMPLES 12–16

These examples show that good adhesion and durability are obtained when various ethylene polymers and a PPM are added to a TPO. The results are shown in Table 6.

In Table 6, the TPO and the PPM are the same as those used in Example 1.

The HDPE is HDPE 4352N high density polyethylene having a melt index of 4 g/10 mm (ASTM D-1238, 2.16 kg at 190° C.), and a density of 0.952 g/cm$^3$ (annealed), and is commercially available from Dow Chemical Company.

Engage EG 8100 ethylene/octene copolymer contains 24% octene and has a melt index of 1.0 g/10 mn, and a density of 0.87 g/cm$^3$, and is commercially available from DuPont Dow Elastomers.

Exact 4033 ethylene/1-butene copolymer contains 22% butene and has a melt index of 0.8 g/10 min, and a density of 0.88 g/cm$^3$, and is commercially available from Exxon Chemical Company.

LLDPE (1) is an ethylene/1-butene/propene terpolymer containing 9% butene and 2% propene that has a density of 0.916 g/ml and a melt index of 1.0 g/10 min.

LLDPE (2) is Dowlex 2049A, which is an ethylene/octene copolymer containing 8% octene, has a density of 0.93 g/cm$^3$ and a melt index of 1.0 g/10 min, and is commercially available from Dow Chemical Company.

TABLE 6

|  | Ex. 12 | Ex. 13 | Ex. 14 | Ex. 15 | Ex. 16 |
|---|---|---|---|---|---|
| TPO | 100 | 100 | 100 | 100 | 100 |
| PPM | 20 | 20 | 20 | 20 | 20 |
| HDPE | 10 | — | — | — | — |
| Engage EG8100 | — | 10 | — | — | — |
| Exact 4033 | — | — | 10 | — | — |
| LLDPE (1) | — | — | — | 10 | — |
| LLDPE (2) | — | — | — | — | 10 |
| B 225 | 0.2 | 0.2 | 0.2 | 0.2 | 0.2 |
| Paint Adhesion (% Failure, g/op) | | | | | |
| 1st Pull | 0/0 | 0/0 | 0/0 | 0/0 | 0/0 |
| 3rd Pull | 0/0 | 0/0 | 0/0 | 0/0 | 0/0 |
| 5th Pull | 0/0 | 0/0 | 0/0 | 0/0 | 0/0 |
| Durability (% Failure) | | | | | |
| 25 Cycles | 3 | 0 | 2.5 | 4 | 18 |
| 100 Cycles | 6 | 0 | 3 | 4 | 24 |

COMPARATIVE EXAMPLES 14–18

This example compares the paint adhesion and durability of a composition of this invention and compositions containing an ethylene polymer but no PPM, or that contain too much ethylene polymer.

In Table 7, the TPO and PPM are the same as those used in Example 1.

TABLE 7

|  | Comp. Ex. 14 | Comp. Ex. 15 | Comp. Ex. 16 | Comp. Ex. 17 | Comp. Ex. 18 |
|---|---|---|---|---|---|
| TPO | 100 | 100 | 100 | 100 | 100 |
| PPM | — | — | — | — | 20 |
| HDPE | 10 | — | — | — | 20 |
| Engage EG8100 | — | 10 | — | — | — |
| Exact 4033 | — | — | 10 | — | — |
| LLDPE (1) | — | — | — | 10 | — |
| B 225 | 0.2 | 0.2 | 0.2 | 0.2 | 0.2 |
| Paint Adhesion (% Failure, g/op) | | | | | |
| 1st Pull | 0/0 | 0/0 | 0/0 | 0/0 | 15/0 |
| 3rd Pull | 0/0 | 0/0 | 0/0 | 0/0 | 23/18 |
| 5th Pull | 0/0 | 0/0 | 0/0 | 0/0 | 70/76 |
| Durability (% Failure) | | | | | |
| 25 Cycles | 28 | 28 | 36 | 46 | 5 |
| 100 Cycles | 35 | 40 | 52 | 58 | 5 |

The data given in Table 7 for Comparative Examples 14–17 show that adding an ethylene polymer to the TPO without adding a PPM produced excellent paint adhesion, but the durability was poor. Comparative Example 18 shows that using too much ethylene polymer gave acceptable durability, but paint adhesion was poor.

Other features, advantages and embodiments of the invention disclosed herein will be readily apparent to those exercising ordinary skill after reading the foregoing disclosure. In this regard, while specific embodiments of the invention have been described in considerable detail, variations and modifications of these embodiments can be effected without departing from the spirit and scope of the invention as described and claimed.

What is claimed is:

1. A composition consisting essentially of, by weight:
(1) a thermoplastic olefin prepared by sequential polymerization in at least two stages, consisting essentially of:
   (a) about 20% to about 70% of a crystalline propylene homopolymer having an isotactic index greater than 90, or a crystalline propylene copolymer with ethylene and/or a $C_{4-8}$ α-olefin having a propylene content greater than 85% and an isotactic index of greater than 85;
   (b) about 20% to about 75% of an amorphous copolymer of ethylene selected from the group consisting of (i) ethylene/propylene, (ii) ethylene/butene-1, (iii) ethylene/octene-1, and (iv) mixtures thereof, optionally containing about 1% to about 10% of a diene, which is xylene soluble at room temperature and contains about 30% to about 70% ethylene; and
   (c) about 2% to about 30% of a semi-crystalline ethylene copolymer selected from the group consisting of (i) ethylene/propylene, (ii) ethylene/butene-1, (iii) ethylene/octene-1, and (iv) mixtures thereof, that is xylene insoluble at room temperature and contains greater than 90% ethylene,
(2) at least 15 to about 50 parts per hundred parts of the thermoplastic olefin (1) of a propylene polymer material prepared by sequential polymerization in at least two stages, consisting essentially of:
   (a) about 10% to about 50% of a crystalline propylene homopolymer having an isotactic index of about 80 to about 99, or a crystalline copolymer having an isotactic index greater than 85, selected from the group consisting of (i) propylene and ethylene, (ii) propylene, ethylene and a $CH_2=CHR$ α-olefin, where R is a $C_{2-8}$ straight or branched alkyl group, and (iii) propylene and an α-olefin as defined above in (a)(ii), the copolymer containing about 85% to about 99% propylene and having an isotactic index of greater than 80 to about 98,
   (b) about 3% to about 20% of a semi-crystalline, essentially linear copolymer having a crystallinity of about 20% to about 60% by differential scanning calorimetry (DSC), wherein the copolymer is selected from the group consisting of (i) ethylene and propylene containing over 50% ethylene; (ii) ethylene, propylene, and an α-olefin as defined above in (a)(ii), containing about 1% to about 10% of the α-olefin and over 50% up to 98% of both ethylene and the α-olefin; and (iii) ethylene and an α-olefin as defined in (a)(ii) containing over 50% up to 98% of the α-olefin, which copolymer is insoluble in xylene at ambient temperature; and
   (c) about 40% to about 80% of a copolymer selected from the group consisting of a copolymer of (i) ethylene and propylene, wherein the copolymer contains from 20% to less than 40% ethylene, (ii) ethylene, propylene, and an α-olefin as defined in (a)(ii), wherein the α-olefin is present in an amount of about 1% to about 10%, and the amount of ethylene and α-olefin present is from 20% to less than 45%; and (iii) ethylene and an α-olefin as defined in (a)(ii), containing from 20% to less than 45% of the α-olefin, and optionally containing about 0.5% to about 10% of a diene, the copolymer (c) being soluble in xylene at ambient temperature, and having an intrinsic viscosity of about 1.7 to about 3.9 dl/g, wherein the total amount of (2)(b) and (2)(c), based on the total propylene polymer material, is about 65% to about 80%, the weight ratio of (2)(b)/(2)(c) is less than 0.4, and the total content of ethylene or $C_{4-8}$ α-olefin or combination thereof in (2)(b)+(2)(c) is less than 50%; and
(3) an ethylene polymer material selected from the group consisting of
   (a) about 2.5 to about 20 parts per hundred parts of the thermoplastic olefin of an oxidized polyethylene wax having an acid number equal to or greater than 15 mg KOH/g, a molecular weight $M_n$ of about 1000 to about 100,000, and a melting point of about 92° C. to about 140° C.,
   (b) about 8 parts to about 18 parts per hundred parts of the thermoplastic olefin of a homopolymer of ethylene having a molecular weight $M_n$ greater than 125,000, and a melt index (ASTM D-1238, 2.16 kg at 190° C.) of 0.5 to about 125 g/10 min, and
   (c) a mixture of (a)+(b), wherein the ratio of (a) to (b) is 0.1 to 0.9, and wherein (2)+(3) is at least 22.5 parts per hundred parts of the thermoplastic olefin.

2. The composition of claim 1 wherein component (1)(a) is a random propylene/ethylene copolymer having an ethylene content of about 1% to about 5%.

3. The composition of claim 1 wherein component (2)(a) is a random propylene/ethylene copolymer.

4. A molded article comprising the composition of claim 1.

5. A molded article comprising the composition of claim 2.

6. A molded article comprising the composition of claim 3.

7. A composition consisting essentially of, by weight:
(1) a thermoplastic olefin consisting essentially of, by weight,
   (a) about 60% to about 90% of a crystalline propylene homopolymer having an isotactic index greater than 90, or a crystalline propylene copolymer with ethylene and/or a $C_{4-8}$ α-olefin having a propylene content greater than 85% and an isotactic index of greater than 85; and
   (b) about 10% to about 40% of an amorphous copolymer of ethylene selected from the group consisting of (i) ethylene/propylene, (ii) ethylene/butene-1, (iii) ethylene/octene-1, and (iv) mixtures thereof, optionally containing about 1% to about 10% of a diene, which is xylene soluble at room temperature and contains about 30% to about 70% ethylene;
(2) at least 15 to about 50 parts per hundred parts of the thermoplastic olefin (1) of a propylene polymer material made by sequential polymerization in at least two stages consisting essentially of:
   (a) about 10% to about 50% of a crystalline propylene homopolymer having an isotactic index of about 80 to about 99, or a crystalline copolymer having an isotactic index greater than 85, selected from the group consisting of (i) propylene and ethylene, (ii) propylene, ethylene and a $CH_2=CHR$ α-olefin, where R is a $C_{2-8}$ straight or branched alkyl group, and (iii) propylene and an α-olefin as defined above in (a)(ii), the copolymer containing about 85% to about 99% propylene and having an isotactic index of greater than 80 to about 98,
   (b) about 3% to about 20% of a semi-crystalline, essentially linear copolymer having a crystallinity of about 20% to about 60% by differential scanning calorimetry (DSC), wherein the copolymer is selected from the group consisting of (i) ethylene and propylene containing over 50% ethylene; (ii) ethylene, propylene, and an α-olefin as defined above in (a)(ii), containing about 1% to about 10% of the α-olefin and over 50% up to 98% of both ethylene and the α-olefin; and (iii) ethylene and an α-olefin as defined in (a)(ii) containing over 50% up to 98% of the α-olefin, which copolymer is insoluble in xylene at ambient temperature; and (c) about 40% to about 80% of a copolymer selected from the group consisting of a copolymer of (i) ethylene and propylene, wherein the copolymer contains from 20% to less than 40% ethylene, (ii) ethylene, propylene, and an α-olefin as defined in (a)(ii), wherein the α-olefin is present in an amount of about 1% to about 10%, and the amount of ethylene and α-olefin present is from 20% to less than 45%; and (iii) ethylene and an α-olefin as defined in (a)(ii), containing from 20% to less than 45% of the α-olefin, and optionally containing about 0.5% to about 10% of a diene, the copolymer (c) being soluble in xylene at ambient temperature, and having an intrinsic viscosity of about 1.7 to about 3.9 dl/g, wherein the total amount of (2)(b) and (2)(c), based on the total propylene polymer material, is about 65% to about 80%, the weight ratio of (2)(b)/(2)(c) is less than 0.4, and the total content of ethylene or $C_{4-8}$ α-olefin or combination thereof in (2)(b)+(2)(c) is less than 50%; and (3) an ethylene polymer material selected from the group consisting of (a) about 2.5 to about 20 parts per hundred parts of the thermoplastic olefin of an oxidized polyethylene wax having an acid number equal to or greater than 15 mg KOH/g, a molecular weight $M_n$ of about 1000 to about 100,000, and a melting point of about 92° C. to about 140° C., (b) about 8 parts to about 18 parts per hundred parts of the thermoplastic olefin of a homopolymer of ethylene having a molecular weight $M_n$ greater than 125,000, and a melt index (ASTM D-1238, 2.16 kg at 190° C.) of 0.5 to about 125 g/10 min, and (c) a mixture of (a)+(b), wherein the ratio of (a) to (b) is 0.1 to 0.9, and wherein (2)+(3) is at least 22.5 parts per hundred parts of the thermoplastic olefin.

8. A molded article comprising the composition of claim 7.

* * * * *

UNITED STATES PATENT AND TRADEMARK OFFICE
CERTIFICATE OF CORRECTION

PATENT NO.   : 6,013,734
DATED        : January 11, 2000
INVENTOR(S)  : Dominic A. Berta It is certified that error appears in the above-identified patent and that said Letters Patent is hereby corrected as shown below:

Column 11,
Line 11, in Table IV, change "Petr. E-2030" to --Petr. E-2020--

Signed and Sealed this

Seventeenth Day of July, 2001

Attest:

Attesting Officer

NICHOLAS P. GODICI
Acting Director of the United States Patent and Trademark Office